May 11, 1937.     H. D. CHURCH     2,079,684
HYDRAULIC REMOTE CONTROL
Filed Dec. 2, 1935     3 Sheets-Sheet 1
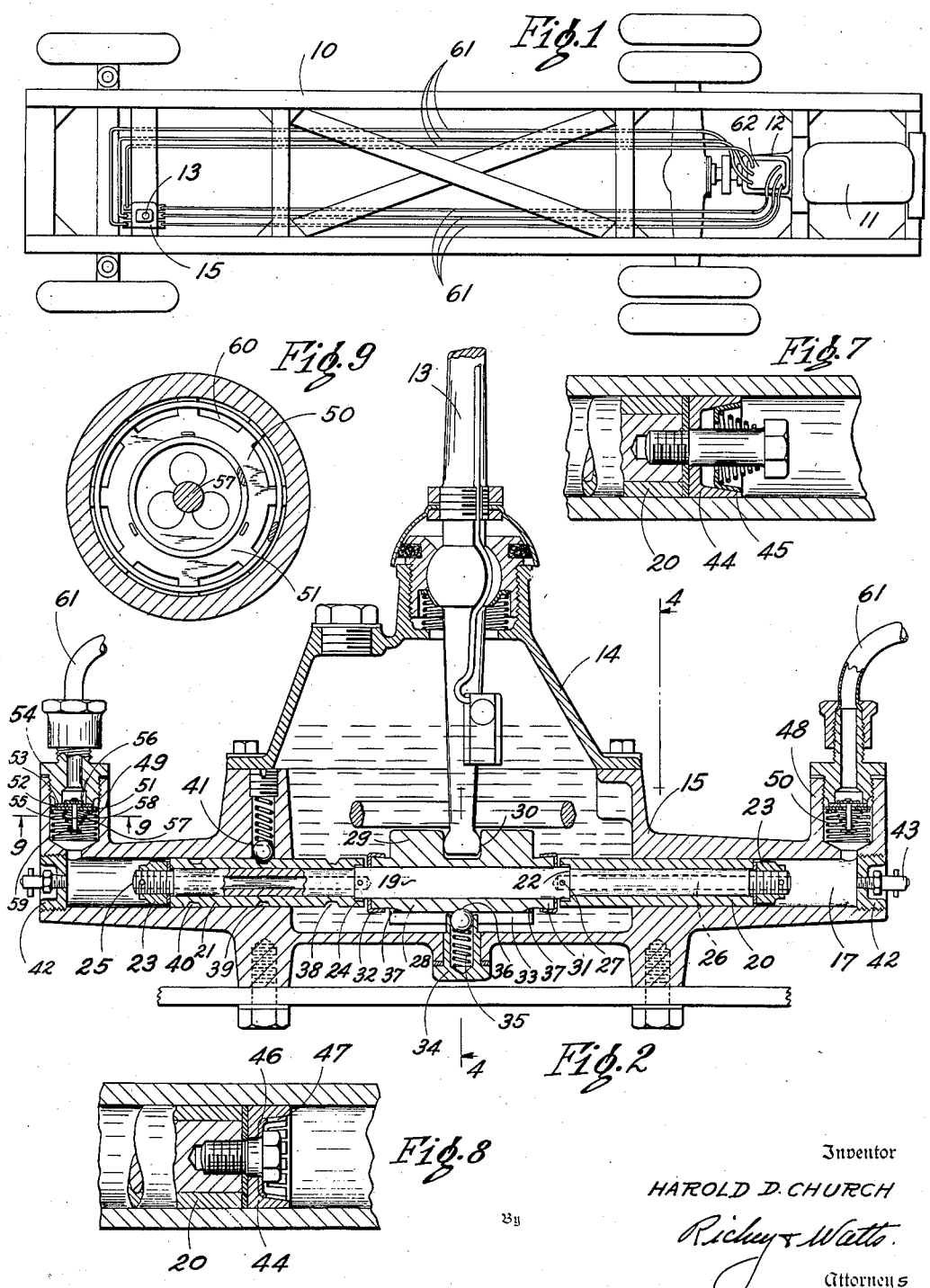
Inventor
HAROLD D. CHURCH
By Richey & Watts
Attorneys

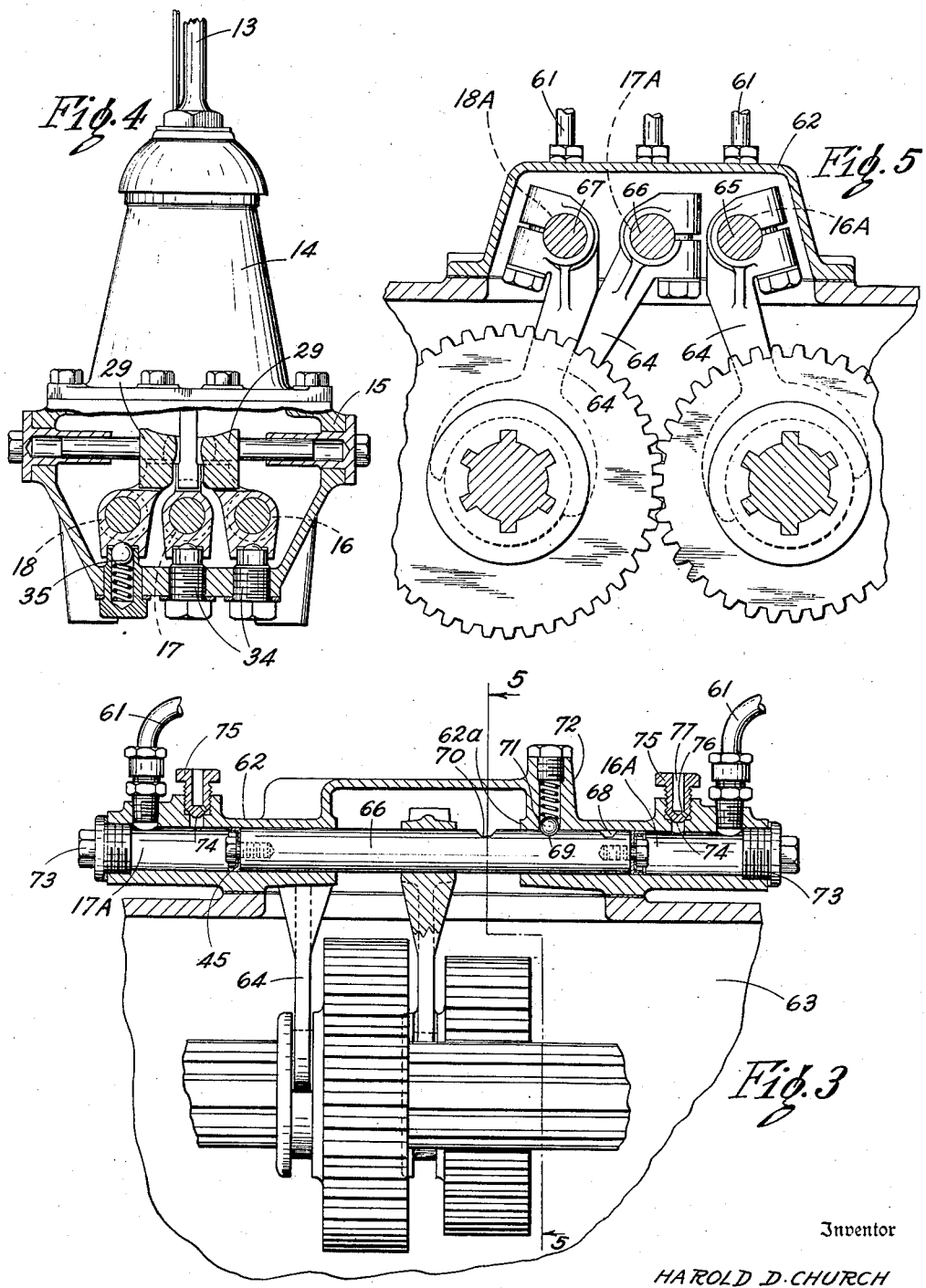

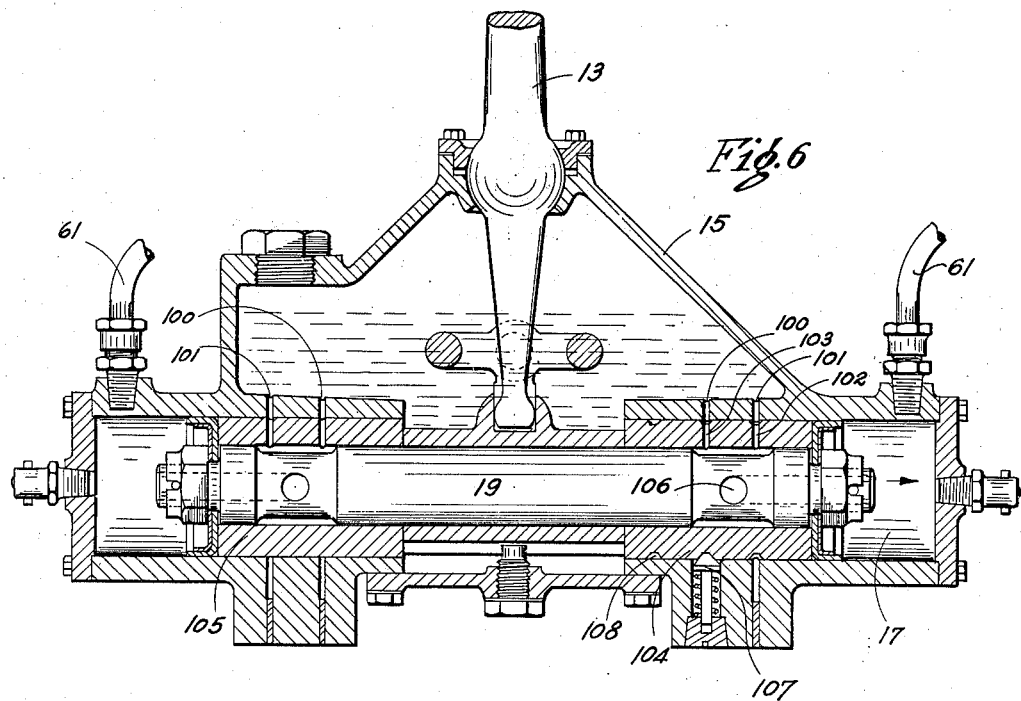
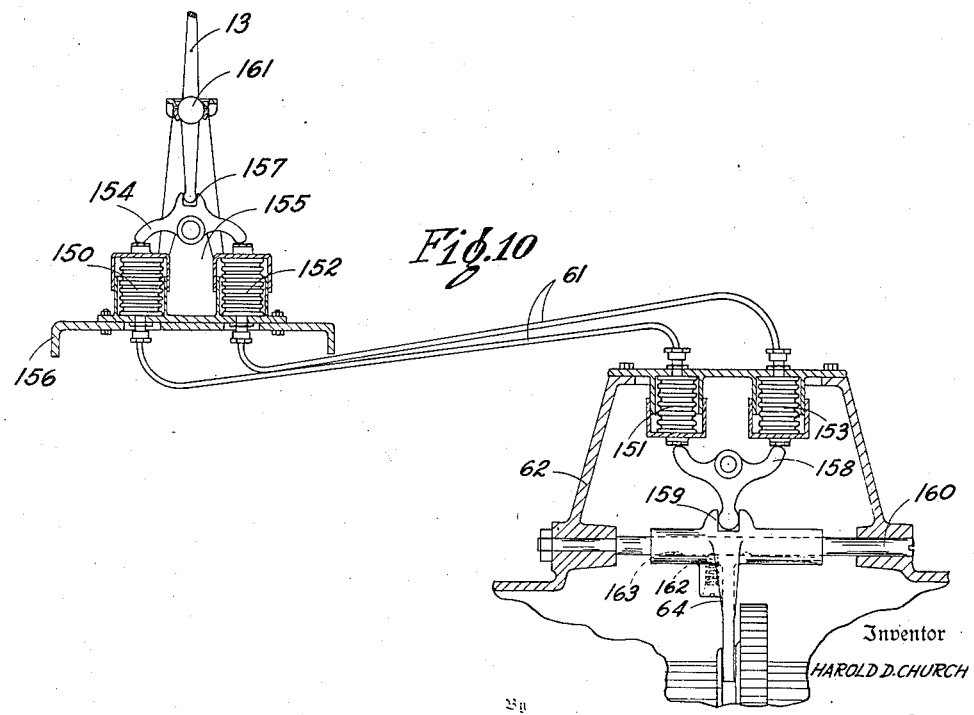

Patented May 11, 1937

2,079,684

UNITED STATES PATENT OFFICE 2,079,684

HYDRAULIC REMOTE CONTROL

Harold D. Church, Cleveland Heights, Ohio

Application December 2, 1935, Serial No. 52,467

3 Claims. (Cl. 74—346)

This invention relates broadly to remote control devices and more specifically to improvements in hydraulic operating mechanisms therefor.

One of the objects of the invention is the provision of a hydraulic control mechanism which is so constructed that the operator may recognize, by the sense of touch, the actuation of the mechanism affected by his adjustment of the device.

Another object of the invention is the provision of a compensative unit in a hydraulic control system which will permit expansion or contraction of the hydraulic fluid therein or slight leakage thereof without impairing the operation or the efficiency of the device.

Another object of the invention is to provide a structure which will permit the admission of fluid to the conduits of the system intermediate each operative adjustment thereof and thus compensate for any loss or escapement of fluid which might occur during operation.

Another object of the invention is the provision of mechanism to effect the automatic closure of the fluid lines irrespective of the position of the fluid reservoir when the actuated parts of the mechanism are in adjusted relation.

Another object of the invention is to provide mechanism to facilitate the escapement of air from the fluid lines when the mechanism is initially filled.

The embodiment chosen herein to illustrate the improved hydraulic control is shown in conjunction with a change speed gearing for an automotive vehicle. It is to be understood, however, that the control mechanism is adaptable for use with other instrumentalities or in other environs and that such uses are contemplated as falling within the scope and spirit of the present invention.

Referring to the drawings:

Fig. 1 is a diagrammatic plan view of an automotive vehicle chassis illustrating the application of the remote control mechanism in an installation where the engine and transmission are disposed at the rear of the vehicle;

Fig. 2 is a sectional view through the gear shift lever housing and the hydraulic control unit associated therewith;

Fig. 3 is a sectional view through a fragmentary portion of the vehicle change speed gearing unit or transmission case and the hydraulic gear shift mechanism coordinated therewith;

Fig. 4 is a view partially in section of the gear shift lever and housing therefor, the section being taken on the plane indicated by the line 4—4 in Fig. 2;

Fig. 5 is a sectional view through a portion of the transmission case shown in Fig. 3, the section being taken on the plane indicated on line 5—5 in Fig. 3;

Fig. 6 is a sectional view of a modified embodiment of the mechanism shown in Fig. 2;

Fig. 7 is a longitudinal sectional view of one form of a piston structure adaptable for use in the hydraulic control unit;

Fig. 8 is a longitudinal sectional view of an alternative form of piston construction;

Fig. 9 is a transverse sectional view through the check valve illustrated in Fig. 2, the section taken on the plane indicated by the line 9—9 in Fig. 2; and Fig. 10 is a diagrammatic view of a modified form of the hydraulic remote control system. This embodiment is shown also in conjunction with a change speed gearing mechanism for an automotive vehicle.

As illustrated in Fig. 1, the vehicle chassis 10 is of the type having the engine 11 disposed in the rearward portion thereof, and having the transmission 12 connected therewith.

The gear shift lever 13, which may be of any conventional form, is disposed adjacent the forward end of the vehicle in the customary position accessible to the vehicle operator. The lever is supported within a casing 14 secured upon a housing 15 which is formed to constitute a reservoir for an incompressible fluid of the type customarily employed in hydraulic brakes and similar mechanisms. The lower portion of the housing 15 is formed with a plurality of bores 16, 17 and 18, each comprising a pair of coaxially aligned cylinders. Within each pair of opposed cylinders there is a rod 19 having sleeves 20 and 21 respectively mounted on the end portions thereof and fitted within the cylinder bores to form pistons. The end portion of the rod 19 is reduced to form shoulders 22 which abut the face of a counterbore within the inner ends of the pistons. The pistons are restrained from longitudinal movement by nuts 23 screwed upon the ends of the rod 19. The counterbores within the ends of the pistons are machined slightly larger than the diameter of the central portion of the rod 19 in order to form an annular chamber or recess 24. This chamber is in fluid communication with the inner end 25 of the cylinder through a longitudinal passage 26 in the rod 19 and a transverse orifice 27 disposed within the recessed end portion of the piston.

Upon the enlarged central body of each of the rods 19 in the cylinders 16, 17 and 18 respectively there is a sleeve 28 adapted for reciprocative movement intermediate the pistons 20 and 21. Each of these sleeves is formed with an upwardly extending boss 29, as will be seen in Fig. 4, having a slot 30 therein adapted for engagement with the spherical end of the gear shift lever 13. The ends of the sleeves 28 are constructed with reduced shouldered portions 31 slightly larger than the contiguous end portions of the pistons 20 and 21. Upon the faces of the ends of the sleeves and engageable with the shoulders 31 thereof there is a resilient pad or cup 32 adapted to abut the ends of the pistons 20 and 21 and seal the annular recess 24 from fluid communication with the reservoir when the gear shift lever 13 is actuated in fluid ejecting adjustment. The lower portion of the sleeves 28 are formed with a key way 33 extended throughout its length and adapted to receive respectively the shanked portions of set screws 34. The set screws are recessed for the reception of spring pressed balls or plunger 35 which are urged into engagement with detents 36 in the central portion of the sleeve and detents 37 adjacent the outer ends thereof.

The piston 21, as illustrated herein, is formed with a series of peripheral grooves 38, 39 and 40 respectively, adapted for engagement with the spring pressed ball or plunger 41 mounted in a recess formed in the housing 15.

The end portions of the cylinders 16, 17 and 18 are closed by screw threaded plugs 42 which are provided with valve closure nipples 43 of any suitable type. These valves are provided to facilitate the filling or charging of the cylinders and conduits communicating therewith upon initial installation of the mechanism. The pistons 20 and 21 may be formed to fit snugly within the respective cylinders or as shown in the modified forms may be provided with flexible cup sealing members 44 which as shown in Fig. 7 may be circumferentially expanded by a spring urged cone 45 or a spring metal washer 46 having fingers 47 engageable with the side walls of the cupped sealing member 44. The outer ends of the cylinders 16, 17 and 18 are formed with bosses 48 and 49 bored to receive check valves 50. The check valve comprises a disc 51 having a resilient packing ring 52 secured on the face thereof and adapted for engagement with an annular seat 53 in the valve cap and coupling member 54. The disc 51 is supported in abutting engagement upon its seat by a spring 55 seated in the bottom of the recessed bosses 48 and 49 and is apertured in the central portion thereof to permit the passage of fluid therethrough. The ring 52 is formed to extend inwardly beyond the valve seat 53 thus forming a ledge for the reception of a disc valve 56 supported upon a stem 57 which is compressively held upon the ring 52 by a conoidal spring 58 intermediate the lower face of the disc 51 and a collar 59 on the end of the valve stem 57. The spring 58 is suitably tensioned to permit the poppet valve 56 to be forced open by manipulation of the lever 13 during the ejectment of the fluid from the cylinders. Obviously the valve 51 will be compressively held upon its seat 53, during this operation. The spring 55, is tensioned to sustain the valve disc 51 upon its seat and prevent escapement of the fluid through the valve seat 53 and slotted openings 60 in the periphery thereof under the maximum gravity head pressure in the conduits 61. The spring will yield, however, and permit the opening of the valve should the fluid become heated and expansion occur. The upper portion of the coupling member 54 is formed to receive a coupling member or union which may be of any suitable type capable of sustaining the fluid pressure imposed thereon.

As will be seen in Fig. 1, each of the cylinders is provided with conduits 61 which communicate respectively with cylinders 16A, 17A and 18A formed in a housing 62 mounted on the transmission casing 63. The change speed gearing or transmission case 63 may be of any conventional form having the sliding members therein controlled by the yoked shifter forks 64. These yokes are secured upon rods 65, 66 and 67 which are mounted within the cylinders 16A, 17A and 18A respectively. The ends of the rods are provided with suitable packing cups 45 which may be of the type shown in Figs. 7 and 8. The rods 65, 66 and 67 are formed with a series of detents 68, 69 and 70 for engagement with a spring pressed ball or plunger 71 retained in a recessed boss 72 formed in the upper portion of the housing 62. The cylinders 16A, 17A and 18A are closed at their outer ends by plugs 73 fitted within the housing to prevent the escapement of the fluid therefrom. These plugs and the closure members for the cylinders 16, 17 and 18 may, if desired, be constructed to provide adjustable stops to limit the outward movement of the pistons. Adjacent the outer ends of each of the cylinders there are passages 74 having a shoulder therein adapted for engagement with the conical end of a bleeder valve 75, screwed into a boss formed in the housing 62. The bleeder valve is formed with a plurality of angularly disposed apertures 76 disposed above the shoulder 74 and in communication with a central passage 77 so that communication can be established between the cylinders and atmosphere when the valves 75 are elevated and thus permit the escapement of air from the cylinder or will seal the fluid from escapement when adjusted into seated position.

In the foregoing disclosure it will be noted that the gear shift lever and the gear selector as shown contemplate a gear box having four forward and one reverse gear ratios. It will be understood, however, that any number of combinations may be employed by adding or subtracting the requisite cylinders to the gear shift and transmission units.

As shown in Fig. 2, the gear shift lever is disposed in a neutral position, the spring pressed plunger 35 being held in the detent 36 to prevent the sleeve 28 from movement due to the vibration of the vehicle. With the sleeve in this position it will be seen that fluid communication is established through the annular opening 24 and passage 26 to each of the cylinders 16, 17 and 18 since the detents 36 and 39 are arranged to maintain a spaced relation between the end of the pistons 20 and 21 and the facing members 32 adjacent thereto. As the operator manipulates the lever 13 in effecting the gear shifting cycle the pressure of the spring 35 will be overcome and the sleeve 28 advanced into abutting engagement with the end of the piston, thus closing fluid communication between the reservoir and the cylinder communicating therewith. Continued movement of the gear shift lever 13 will advance the piston and thus force the fluid from the cylinder through the valve 50 and into the transmission case cylinder connected thereto by the conduit 61. It will be noted that as the piston is advanced to eject the fluid from its cylinder the piston coaxially aligned therewith will be retracted, thus permitting the escapement of fluid from the opposed cylinder in the transmission case. As the piston reaches the end of its travel the shifter fork 64 will abut the shoulder 62a in the casing, at which time the spring pressed plunger 71 will drop into the contiguous detent and thus prevent further movement of the piston 66 due to vibratory reactions of the vehicle. At the same time the spring pressed plunger 41 will fall into the detent 38 in the piston 21 of the gear shift lever unit.

Assuming the cylinders 16, 17 and 18 to be the same size as the cylinders 16A, 17A and 18A and the pistons therein traveling in the same displacement ratio the three sets of detents 38, 39 and 40, 36 and 37 and 68, 69 and 70 may be machined in equidistant spaced relation. Should the displacement ratios of the cylinders be different the detents would obviously be spaced in proportionate ratio thereto. When the pistons have been actuated in their adjusted position fluid communication is re-established between the reservoir and the cylinders respectively as the detents 37, 36 and 37 are spaced equidistant the detents 38, 39 and 40 to cause the sleeve 28 to be centralized between the inner end portions of the pistons 20 and 21.

During operation the valves 50 will effect the retention of fluid within the lines 61 and the cylinders will be filled through the passages 26 and 27 in the pistons irrespective of the inclination of the vehicle or of the expanded or contracted condition of the fluid in the system.

As illustrated in Fig. 6, the reservoir and the housing 15 are provided with a pair of canals 100 and 101 which are disposed to register with ports 102 and 103 in the pistons 104 and 105 respectively. The ports 102 and 103 are in fluid communication with the cylinders 16, 17 and 18 respectively through passage 106 communicating with an annular recess about the contiguous portion of the rods 19. In neutral position, as illustrated in Fig. 6, the cylinders are in fluid communication with the reservoir. However, upon reciprocation of the piston 104 in the direction indicated by the arrow in Fig. 6, the ports 102 and 103 will be moved from registration with the ports 100 and 101 respectively until the piston has reached the end of its stroke when the spring plunger 107 will fall into detent 108 at which time the port 103 will be in registration with the port 101. It will thus be seen that fluid communication is arrested during reciprocation of the piston but that it will be re-established at the end of the travel of the piston. Obviously, this structure will permit the cylinders and conduits connected therewith to be completely filled with fluid under normal operating conditions.

As shown in Fig. 10, the remote control mechanism embodies a pair of intercommunicating diaphragms or cylinders 150 and 151 and a second pair of intercommunicating cylinders 152 and 153. These cylinders or diaphragms are of the type capable of being collapsed or expanded to permit the egress and ingress of fluid from one cylinder to the other. The cylinders 150 and 152 are engageable with a rocker arm 154 suitably fulcrumed upon a bracket 155 mounted upon a frame 156. The rocker arm is provided with a slot 157 adapted for engagement with the spherical end of the gear shift lever 13. The cylinders 151 and 153 are engageable with a double arm bell crank 158 pivotally supported in the transmission housing cap 62. The lower leg of the bell crank 158 is engageable with a slot 159 in the sleeved portion of a shifter fork 64 which is yoked to span the collar of one of the change speed sliding members in the customary manner. The shifter fork 64 is mounted for reciprocative movement upon a rod 160 secured in the change speed gearing cap 62.

In operation when the gear shift lever 13 is adjusted upon its bearing seat 161, as for instance to depress the cylinder or diaphragm 150, the incompressible fluid therein will be expelled and driven into the diaphragm 151 whereupon the bell crank 158 will be oscillated and the shifter fork 64 reciprocated to move the shifter member into engaging position. During this cycle of operation the second arm of the bell crank 158 will effect the discharge of fluid in the diaphragm 153 and the ingress of fluid to the cylinder 152. The fluid in the respective conduits and cylinders is at this time retained in adjusted position by the engagement of the spring pressed plunger 162 with the detents 163 formed in the rod 160.

Although the foregoing description is necessarily of a detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

I claim:

1. In combination with an automobile change speed gearing mechanism embodying a gear shift lever, a transmission case, a plurality of sliding gears therein, and a plurality of shiftable yokes operatively co-ordinated therewith, a hydraulic remote control mechanism therefor comprising a housing adapted to support said gear shift lever therein, the walls of said housing defining a reservoir, an incompressible fluid therein, a plurality of coaxially disposed cylinders in said housing, pistons in said cylinders, rods uniting the pistons in each pair of coaxially aligned cylinders, sleeves on said rods formed with slots adapted to receive the free end of said gear shift lever, fluid passages in said rods communicating with said reservoir and each cylinder respectively, a plurality of coaxially disposed cylinders in said transmission case, a rod constituting pistons extending within each pair of the coaxially disposed cylinders in said transmission case, said yokes being mounted on the central portion of said rods, conduits interconnecting respectively each pair of coaxially disposed cylinders in said housing with a pair of coaxially disposed cylinders in said transmission case, means co-ordinated with said sleeves in said first named pistons for sealing said fluid passages therein while the pistons are shifted to fluid ejecting position in their cylinders, and means to effect fluid communication between said reservoir and said cylinder after said pistons are adjusted to fluid ejecting position in their cylinders.

2. In combination with a change speed gearing mechanism embodying a gear shift lever, transmission case, a sliding gear and shifter yoke, a hydraulic control therefor comprising, a pair of coaxially aligned cylinders in said transmission case, pistons therein interconnected by a continuous bar having said shifter yoke thereon, a housing adapted to support said gear shift lever, the walls of said housing defining a reservoir, an incompressible fluid in said reservoir, a pair of coaxially disposed cylinders in said housing, pistons in said cylinders, a bar interconnecting said pistons, a sleeve on said bar, abutments therein for engagement with said gear shift lever, fluid passages in said rod communicating with the respective cylinders and each terminating with a port opening into said reservoir, said sleeve being mounted for sliding movement on said rod and adapted to close said ports when said pistons are shifted to their fluid ejection position in their respective cylinders, yieldable means for retaining said sleeve in adjusted position, conduits connecting the cylinders in said housing with the cylinders in said transmission case whereby the fluid ejected from a cylinder in said housing will actuate a piston in the cylinder of the transmission case, and means for effecting fluid communication between said cylinders when said pistons are adjusted in their respective cylinders.

3. A hydraulic remote control mechanism comprising a reservoir, a pair of coaxially disposed cylinders, a second pair of coaxially disposed cylinders, interconnected pistons in each pair of coaxially disposed cylinders, conduits connecting the outer end portions of the first named cylinders with the outer end portions of the second named cylinders, a sleeve mounted upon the interconnecting portion of the pistons in the first named cylinders, fluid passages through said pistons in the first named cylinders connecting each of the cylinders with said reservoir, said sleeve being arranged relative to the openings of said passages into said reservoir to effect the closure thereof during the period in which said sleeve is being adjusted to cause the piston to eject the fluid from its cylinder, yieldable means for retaining said sleeve in actuated position, and means to effect fluid communication between said reservoir and said cylinder after the adjustment of said piston.

HAROLD D. CHURCH.